United States Patent
Smith et al.

(10) Patent No.: US 9,223,906 B2
(45) Date of Patent: Dec. 29, 2015

(54) GENERATING THERMAL ZONES

(75) Inventors: Lillian M. Smith, Cambridge, MA (US);
John F. Kennedy, Santa Rosa, CA (US);
Markus Bonn, Columbus, OH (US);
Aryn Bergman, San Francisco, CA (US); Ian Molloy, Waltham, MA (US);
R. David Scheer, III, San Francisco, CA (US); Jing Lan, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 667 days.

(21) Appl. No.: 13/605,743

(22) Filed: Sep. 6, 2012

(65) Prior Publication Data

US 2013/0066473 A1    Mar. 14, 2013

Related U.S. Application Data

(60) Provisional application No. 61/531,592, filed on Sep. 6, 2011.

(51) Int. Cl.
*G05D 23/00* (2006.01)
*G06F 17/50* (2006.01)

(52) U.S. Cl.
CPC ........ *G06F 17/5004* (2013.01); *G06F 2217/80* (2013.01)

(58) Field of Classification Search
CPC ........... G06F 17/50004; G06F 2217/80; F24F 11/009; F24F 11/006; F24F 11/0012; G05D 23/1917; G05D 23/1934
See application file for complete search history.

(56) References Cited

U.S. PATENT DOCUMENTS

| 4,215,408 | A | 7/1980 | Games et al. |
| 5,976,010 | A | 11/1999 | Reese et al. |
| 8,959,005 | B2* | 2/2015 | Olsson et al. ............... 703/1 |
| 2004/0239494 | A1* | 12/2004 | Kennedy et al. ............ 340/500 |
| 2008/0249756 | A1* | 10/2008 | Chaisuparasmikul ........ 703/13 |
| 2009/0070173 | A1 | 3/2009 | Walker |
| 2009/0271154 | A1 | 10/2009 | Coad et al. |
| 2011/0246381 | A1* | 10/2011 | Fitch et al. ............... 705/313 |
| 2013/0085718 | A1* | 4/2013 | Bernhardt et al. ............. 703/1 |
| 2013/0144546 | A1* | 6/2013 | Brackney et al. ........... 702/61 |

OTHER PUBLICATIONS

Hwang Yi (2015): User-driven automation for optimal thermal-zone layout during space programming phases, Architectural Science Review, DOI: 10.1080/00038628.2015.1021747.*

(Continued)

*Primary Examiner* — M. N. Von Buhr
(74) *Attorney, Agent, or Firm* — Fish & Richardson P.C.

(57) ABSTRACT

Methods, systems, and apparatus, including computer programs encoded on a storage medium, for generating thermal zones. In one aspect, a method includes identifying a perimeter zone for a first portion of a conceptual representation of a building; and dividing the perimeter zone into a plurality of thermal zones, comprising: determining a plurality of first candidate thermal zones based at least in part on a maximum thermal zone angle threshold that each of the first candidate thermal zones satisfy, determining a plurality of second candidate thermal zones based at least in part on a maximum thermal zone length threshold that each of the second candidate thermal zones satisfy, and selecting a plurality of thermal zones from the first candidate thermal zones and the second candidate thermal zones.

42 Claims, 6 Drawing Sheets

(56) References Cited

OTHER PUBLICATIONS

Purdy et al. (2001), The Significant Factors in Modelling Residential Buildings, Building Simulation, 7$^{th}$ International IBPSA Conference, p. 207-214.*

EE4 Software, Version 1.7, Modelling Guide (2008), Natural Resources Canada.*

Lee W. Young, Authorized Officer, International Search Report and Written Opinion in PCT/US12/54017 mailed Feb. 5, 2013, 14 pages.

Kim et al., Automated Building Height Extraction and Building Detection from High Resolution Aerial and Space Imagery, Dec. 15, 1994 http://www.mva-org.jp/Proceedings/CommemorativeDVD/1994/papers/1994364.pdf> p. 366.

Philippe Bécamel, Authorized Officer, International Preliminary Report on Patentability in PCT/US2012/054017, mailed Mar. 20, 2014, 5 pages.

* cited by examiner

GENERATING THERMAL ZONES

CROSS-REFERENCE TO RELATED APPLICATION

This application claims the benefit under 35 U.S.C. §119(e) of U.S. Patent Application No. 61/531,592, entitled "Generating Thermal Zones", filed Sep. 6, 2011, which is incorporated by reference herein in its entirety.

BACKGROUND

This disclosure relates generally to computer aided design (CAD) tools and techniques.

Simulating a building's energy use is becoming increasingly important as energy prices increase and regional governments mandate conformance with stricter energy efficiency standards and/or reduction in carbon emissions. In order to effectively simulate a building's energy use based on a conceptual representation of the building, the representation can be divided into thermal zones.

SUMMARY

In general, one innovative aspect of the subject matter described in this specification can be embodied in methods that include the actions of identifying a perimeter zone for a first portion of a conceptual representation of a building; and dividing the perimeter zone into a plurality of thermal zones, comprising: determining a plurality of first candidate thermal zones based at least in part on a maximum thermal zone angle threshold that each of the first candidate thermal zones satisfy, determining a plurality of second candidate thermal zones based at least in part on a maximum thermal zone length threshold that each of the second candidate thermal zones satisfy, and selecting a plurality of thermal zones from the first candidate thermal zones and the second candidate thermal zones. Other embodiments of this aspect include corresponding systems, apparatus, and computer programs, configured to perform the actions of the methods, encoded on computer storage devices.

These and other embodiments can each optionally include one or more of the following features. The perimeter zone can be defined as an area between an external curve loop and a corresponding interior curve loop, where the external curve loop represents an intersection between the first portion of the conceptual representation and a level plane. The corresponding internal loop can be offset from the external loop by a specified perimeter distance.

Dividing the perimeter zone into the plurality of thermal zones can include: dividing the perimeter zone into one or more initial thermal zones, each of the initial thermal zones being defined as an area between a respective portion of the external curve loop and a corresponding portion of the interior curve loop. Determining the plurality of first candidate thermal zones based at least in part on the maximum thermal zone angle threshold can include: for each of the one or more initial thermal zones, dividing the initial thermal zone into one or more first candidate thermal zones such that a respective angle of each of the first candidate zones does not exceed the maximum thermal zone threshold angle. Each of the first candidate thermal zones can have an equal angle.

Determining the plurality of second candidate thermal zones based at least in part on the maximum thermal zone length threshold can include: for each of the one or more initial thermal zones, dividing the initial thermal zone into one or more second candidate thermal zones such that a respective length of each of the second candidate zones does not exceed a threshold length. Each of the second candidate thermal zones can be of equal length.

Selecting the plurality of thermal zones can include: comparing a total number of first candidate thermal zones to a total number of second candidate thermal zones.

The method can further include: determining that a combined length of a first thermal zone and a second, adjacent thermal zone is below a first threshold value; and combining the first thermal zone and the second thermal zone. The method can further include determining that a combined length of a third thermal zone and a fourth, adjacent thermal zone is greater than the first threshold value but below a second threshold value; determining that an angle along both the third thermal zone and the fourth thermal zone is below a third threshold value; and combining the third thermal zone and the fourth thermal zone.

Each of the plurality of thermal zones can have a substantially even exposure to external factors affecting heating and cooling of the thermal zone.

The method can further include dividing the conceptual representation of the building into a plurality of thermal zone volumes, comprising: combining the thermal zones for the first portion of the building with thermal zones for one or more other, different portions of the building to generate the thermal zone volumes. The method can further include providing the thermal zone volumes to an energy simulation process for simulating energy use in the building.

Particular embodiments of the subject matter described in this specification can be implemented to realize one or more of the following advantages. A conceptual representation of a building can be automatically divided into thermal zones that conform to industry standards. The thermal zones can be generated to conform to industry standards without requiring that a user be familiar with the standards or with how to divide their conceptual model into thermal zones. Thus, the thermal zones can be generated such that each of the thermal zones has a substantially even exposure to external factors, e.g., external factors such as sunlight and wind that affect the heating and cooling of the zone, without requiring the user to be knowledgeable about the effects of external factors such as wind and sunlight. The automatically generated thermal zones can be used to effectively model the energy use of the building.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
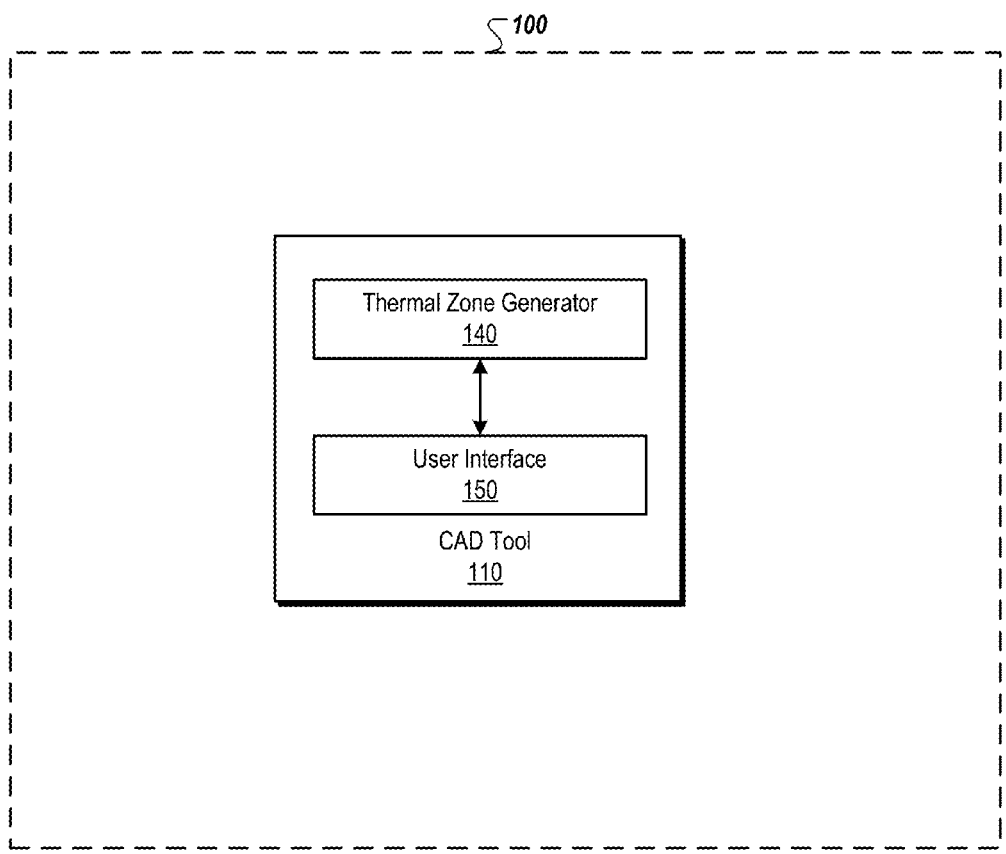
FIG. 1 is a diagram of an example system for dividing a conceptual representation of a building into thermal zones.

FIG. 1 is a high-level illustration of a CAD system 100 for dividing a conceptual representation of a building into thermal zones. Although this diagram depicts objects/processes as logically separate, such depiction is merely for illustrative purposes. The objects/processes portrayed in this figure can be arbitrarily combined or divided into separate software, firmware, or hardware components. Furthermore, such objects/processes, regardless of how they are combined or divided, can execute on the same data processing apparatus or can be distributed among different data processing apparatus connected by one or more networks (e.g., the Internet).

CAD system 100 includes a CAD tool 110 (e.g., a Building Information Model Application (BIMA)). The CAD tool 110 includes, without limitation, a thermal zone generator 140, and a user interface 150. The CAD tool 110 allows a user to generate and/or load a three-dimensional conceptual representation of a building design that can later be used as "form work" for a building information model. The conceptual representation can be viewed and, optionally, modified, through the user interface 150. The conceptual representation includes information describing, for example, the exterior geometry of the building and the location of each floor level. The conceptual representation may be freely modeled by the user through the user interface 150 using CAD tool 110, or imported via a solid geometry file format (e.g., DWG). Geometric information is obtained by transforming three-dimensional (3D) polygons describing surfaces and openings in the conceptual representation into rectangular geometry (i.e., planar, rectangular surface with height and width, tilt, and azimuth orientation).

Thermal zone generator 140 divides one or more floors of the conceptual representation of the building into thermal zones. In some implementations, the thermal zone generator 140 iteratively divides each portion, e.g., each floor, of the building into thermal zones. Once each portion has been divided into thermal zones, the thermal zone generator 140 can generate thermal zone volumes for the conceptual representation of the building by combining the thermal zones for each portion.

Figure 2:
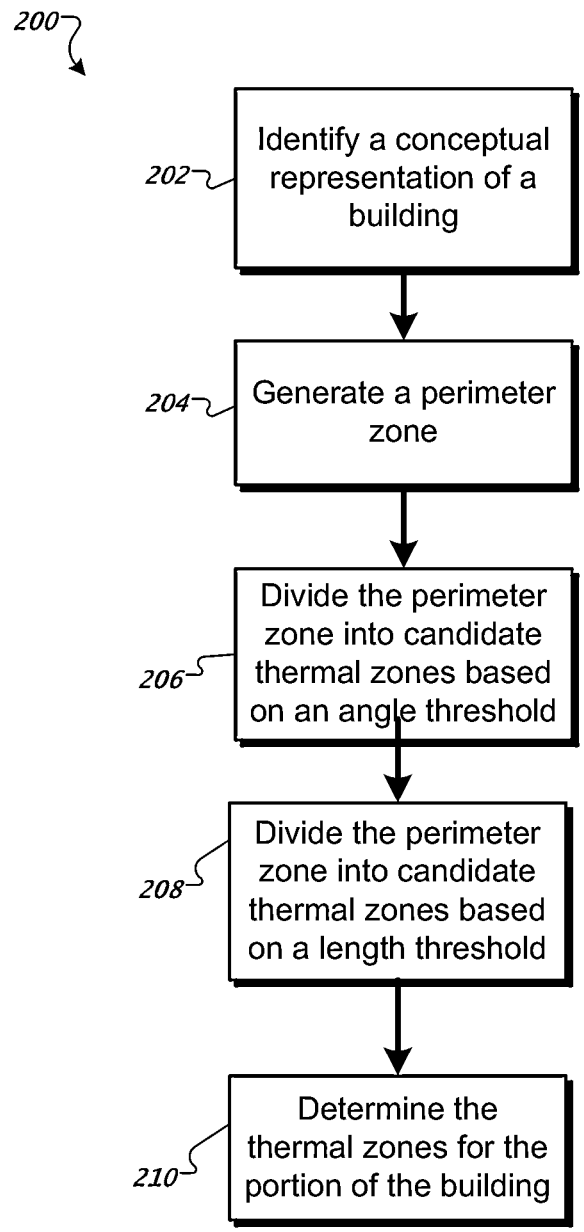
FIG. 2 is a flow diagram of an example technique for automatically dividing a portion of a conceptual representation of a building into thermal zones.

FIG. 2 is a flow diagram of an example technique 200 for automatically dividing a portion of a conceptual representation of a building into thermal zones. For convenience, the technique 200 will be described with respect to a system, including one or more data processing apparatus, that performs the technique 200. For example, the technique 200 can be performed by a CAD system, e.g., CAD system 100 of FIG. 1.

The system receives a conceptual representation of a building, for example, a mass form of the building, including one or more portions, e.g., floor levels (202). For example, a set of mass form faces can define the mass form and one or more user-defined floor levels can define volumetric spaces within the mass form.

The system generates a perimeter zone for a portion of the conceptual representation (204). The portion of the conceptual representation can be, for example, one of the floor levels of the building. In order to generate the perimeter zone, the system uses the conceptual representation to generate an exterior curve loop that represents the intersection of a level plane with the mass form at a specified point within the portion, i.e., a curve loop that defines the perimeter of the portion of the building. For example the specified point may be at the bottom of the portion or at the vertical midpoint of the portion.

The external curve loop is composed of one or more curves. The system generates an interior curve loop that corresponds to, e.g., is parallel to, the exterior curve loop. In some implementations, the interior curve loop is offset from the exterior curve loop by a specified perimeter distance. The system then defines the perimeter zone as the area between the exterior curve loop and the interior curve loop.

The system divides the perimeter zone into candidate thermal zones based on a maximum thermal zone angle threshold (206). The system can divide the perimeter zone into initial thermal zones. The initial thermal zones are determined by the curves of the external curve loop, e.g., so that the system generates an initial thermal zone for each curve of the external curve loop. That is, each initial thermal zone will be defined by the area between a respective curve of the external curve loop and the portion of the interior curve loop that corresponds to the respective curve.

For each of the initial thermal zones, the system determines whether the zone is to be divided further based on the maximum thermal zone angle threshold. The angle threshold is a maximum value of the overall angle of the curve of a zone. If the curve that defines the initial thermal zone is a spline, the curve is divided into portions at each inflection point of the spline, i.e., the curve is divided at each point that it changes concavity so that each portion of the curve bends in the same direction. The angle of each portion is then measured individually.

If the overall angle of the curve of a zone exceeds the angle threshold, the system divides the zone into multiple zones, with each of the multiple zones having an equal angle that is lower than the maximum thermal zone angle threshold.

Once the initial zone has been divided into zones having equal angles (or if the initial zone has an angle below the maximum thermal zone angle threshold), the system determines whether the length of each of the resulting zones exceeds a maximum thermal zone length threshold. The length threshold is a specified maximum value for the length of a thermal zone. If any of the resulting zones have a length that exceeds the maximum length, that zone is further divided into pieces of equal length such that the length of each piece does not exceed the maximum length threshold. In some implementations, the length of each of the new pieces must also not be below a minimum thermal zone length threshold value.

The remaining zones, i.e., the initial thermal zones having an overall angle less than the maximum angle threshold and a length less than the maximum length threshold and the zones that resulted from dividing the other initial thermal zones as described above, are selected as the candidate thermal zones for the maximum thermal zone angle threshold.

The system divides the perimeter zone into candidate thermal zones based on a maximum thermal zone length threshold (208). The system divides the perimeter zone into initial zones, e.g., as described above with reference to step 206.

For each of the initial zones, the system determines whether the zone has a length that exceeds the length threshold. For each zone that has a length exceeding the length threshold, the system divides the zone into multiple zones that have equal length such that the length of each piece does not exceed the maximum length. In some implementations, the length of each of the new zones must also not be below the minimum length.

Once the system divides the initial zones such that none of the zones have a length exceeding the maximum length, the system determines whether each resulting zone has an overall angle that exceeds the angle threshold, e.g., as described above with reference to step 206. Those zones that have an overall angle that exceeds the angle threshold are divided into equal angle zones.

The remaining zones, i.e., the initial thermal zones having a length less than the maximum length threshold and an overall angle less than the maximum angle threshold and the zones that resulted from dividing the other initial thermal zones as described above, are selected as the candidate thermal zones for the maximum thermal zone angle threshold.

The system determines the thermal zones for the portion of the conceptual representation (210). The thermal zones are selected from the candidate thermal zones computed based on the angle threshold and the candidate thermal zones computed based on the length threshold. In some implementations, the system compares the total number of candidate thermal zones computed based on the angle threshold to the total number of candidate thermal zones computed based on the length threshold. The system then selects the candidate zones computed based on the threshold that yields the smallest number of total candidate zones as the thermal zones. For example, if computing candidate thermal zones based on the angle threshold yields four total candidate zones and computing candidate thermal zones based on the length threshold yields five total candidate zones, the system will select the four candidate thermal zones computed based on the angle threshold as the thermal zones.

In some implementations, the system combines any two adjacent thermal zones into a single thermal zone if the two adjacent thermal zones satisfy certain angle or length thresholds. For example if two adjacent thermal zones have a combined length below a first threshold value, the system may combine the two thermal zones into a single thermal zone. In some implementations, the two adjacent thermal zones may still be combined even if their combined length exceeds the first threshold value. For example, if the two adjacent thermal zones have a combined length that is greater than the first threshold value but below a second, larger threshold value and the overall angle along each of the thermal zones is below a third threshold value, the system can combine the two thermal zones into a single thermal zone.

The various threshold values and the perimeter distance can be specified so that the final thermal zones conform to industry standards and so that the area within each thermal zone has a substantially even exposure to external factors. Thus, a user of the system need not be familiar with the industry standards and the generated thermal zones can be used to effectively simulate the energy use of the building without the user having to manually specify accurate thermal zones for each portion of the building. For example, the specified perimeter distance may be fifteen feet, the specified maximum thermal zone angle threshold may be forty five degrees, the specified maximum thermal zone length threshold may be seventy feet, the minimum length threshold may be thirty five feet, the first threshold value may be fifty feet, the second threshold value may be seventy feet, and the third threshold value may be forty five degrees.

Figure 3A:
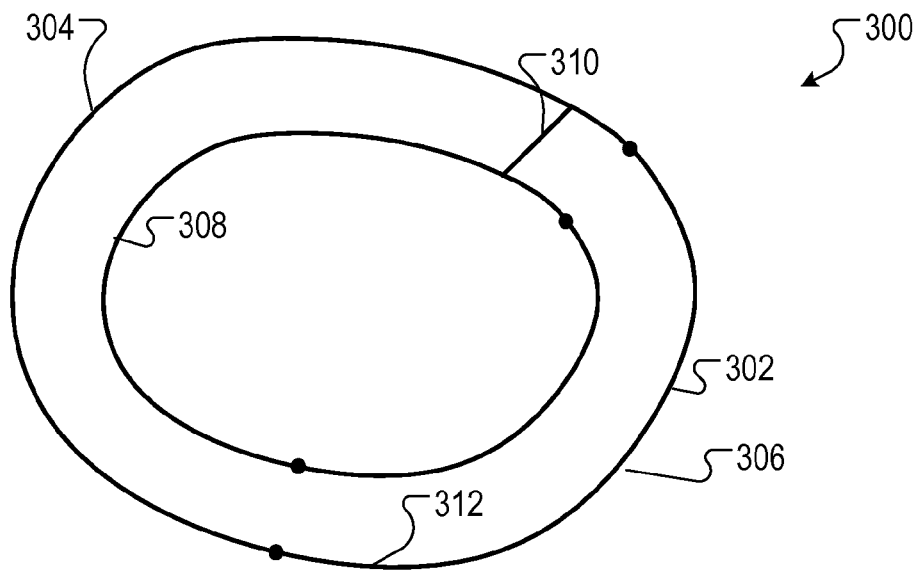
FIG. 3A illustrates an example portion of a conceptual representation of a building.

FIG. 3A illustrates an example portion 300 of a conceptual representation of a building. The portion 300 includes an exterior curve loop 302 that is composed of a first curve 304, e.g., derived from a first spline edge, and a second curve 306, e.g., derived from a second spline edge. The portion 300 also includes an interior curve loop 308 that corresponds to the exterior curve loop 302. The interior curve loop 308 is offset from the exterior curve loop 302 by a specified perimeter distance 310. A perimeter zone 312 is defined by the area between the exterior curve loop 302 and the interior curve loop 308.

Figure 3B:
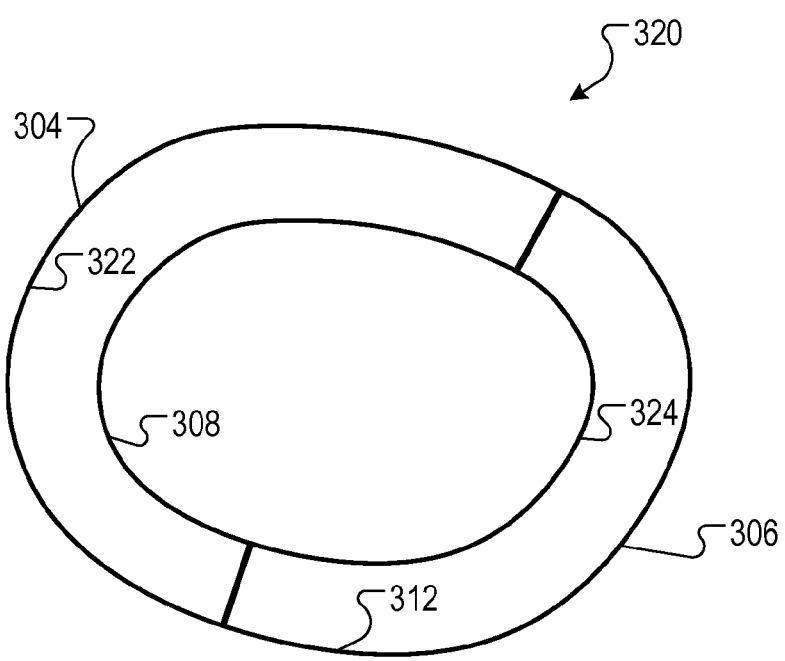
FIG. 3B illustrates an example portion of a conceptual representation of a building with a perimeter zone divided into initial thermal zones.

FIG. 3B illustrates an example portion 320 of a conceptual representation of a building with a perimeter zone 312 divided into initial thermal zones. The initial thermal zones 322 and 324 are defined by the first curve 304 and the second curve 306, respectively. That is, the initial thermal zone 322 is the area between the first curve 304 and the portion of the interior curve loop 308 that corresponds to the first curve. Similarly, the initial thermal zone 324 is the area between the second curve 306 and the portion of the interior curve loop 308 that corresponds to the second curve.

Figure 3C:
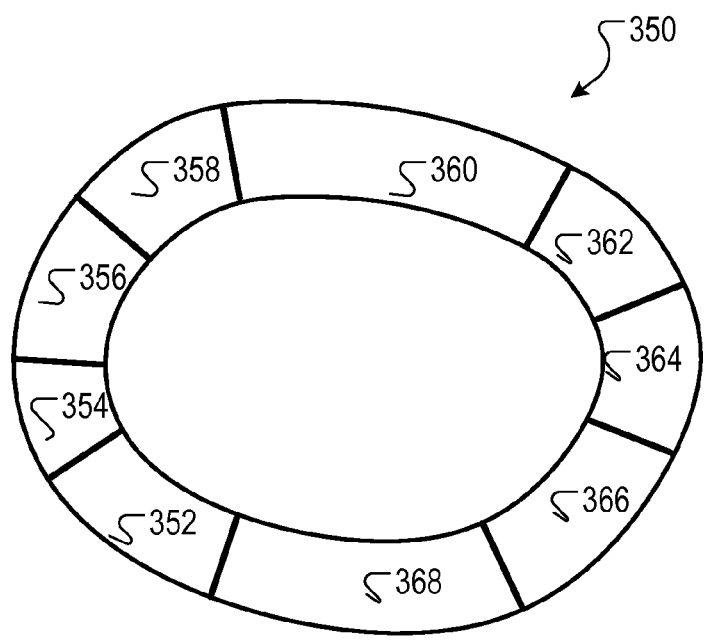
FIG. 3C illustrates an example portion of a conceptual representation of a building with a perimeter zone divided into thermal zones.

FIG. 3C illustrates an example portion 350 of a conceptual representation of a building with a perimeter zone 312 divided into thermal zones. The initial thermal zone 322 has been divided into thermal zones 352, 354, 356, 358, and 360. Each of the thermal zones 352, 354, 356, 358, and 360 has an overall angle (38 degrees each) that is below an angle threshold. The initial thermal zone 324 has been divided into thermal zones 362, 364, 366, and 368. Each of the thermal zones 362, 364, and 366 has an overall angle (42.5 degrees each) that is below an angle threshold. Additionally, each of the thermal zones has a length below a length threshold. A system may have selected the thermal zones that divided each of the initial thermal zones 322 and 324 into zones having equal overall angles instead of thermal zones that divided the initial thermal zones into zones that have equal lengths, e.g., because the thermal zones generated using the latter method resulted in a larger total number of thermal zones.

Figure 3D:
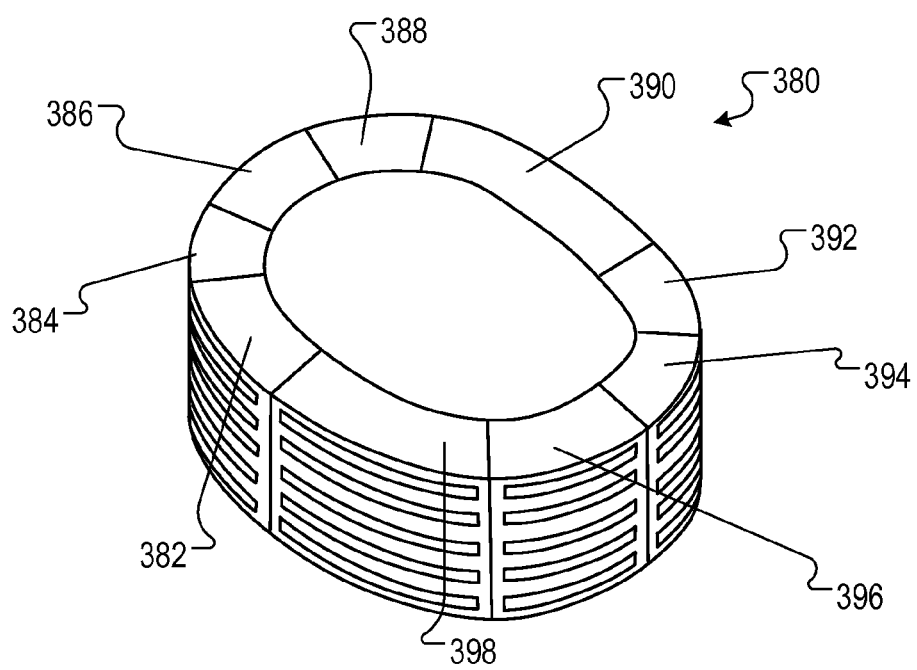
FIG. 3D illustrates an example conceptual representation of a building divided into thermal zone volumes.

FIG. 3D illustrates an example conceptual representation 380 of a building divided into thermal zone volumes. The thermal zone volumes 382, 384, 386, 388, 390, 392, 394, 396, and 398 can be generated by combining the thermal zones for each floor of the building. For example, the thermal zones 352, 354, 356, 358, 360, 362, 364, 366, and 368 can have been combined with thermal zones from the other floors of the building to generate the thermal zone volumes.

Figure 4:
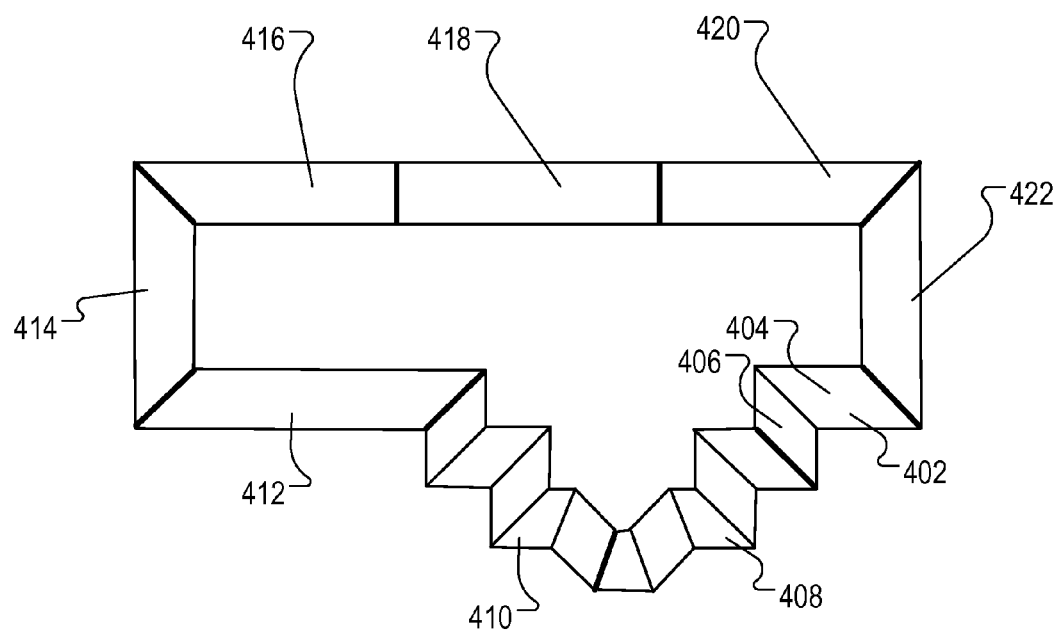
FIG. 4 illustrates another example portion of a conceptual representation of a building divided into thermal zones

FIG. 4 illustrates an example conceptual representation 400 of a floor of a building divided into thermal zones 402, 408, 410, 412, 414, 416, 418, 420, and 422. The thermal zones include thermal zone 402, which is composed of a first area 404 and a second area 406. The thermal zone 402 can have been generated by combining the first area 404 and the second area 406, e.g., because first area 404 and second area 406 were thermal zones that had a combined length that was less than the first threshold value. Thermal zones 408 and 410 can also have been generated by combining two or more thermal zones.

Figure 5:
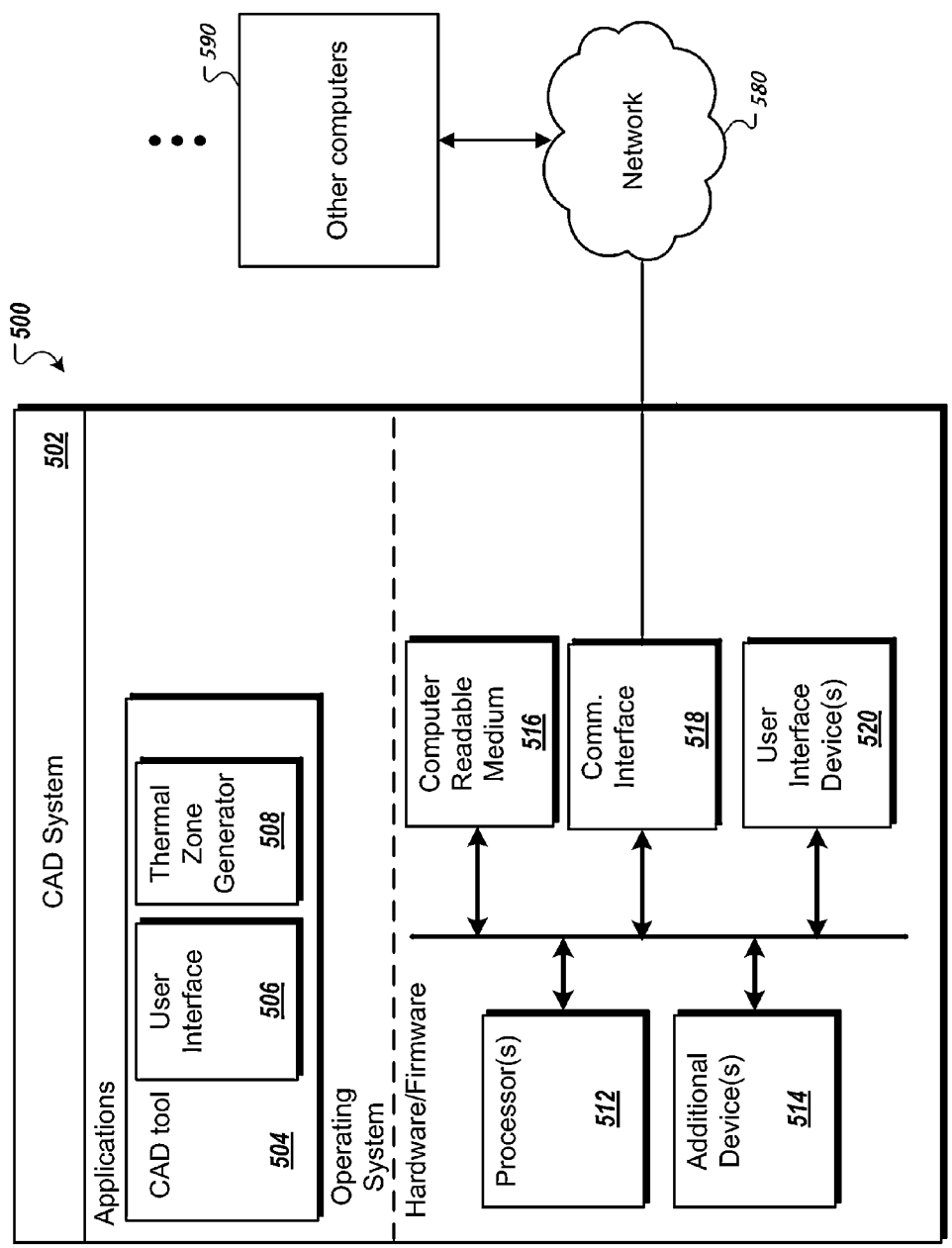
FIG. 5 is a schematic diagram of an example system for dividing a conceptual representation of a building into thermal zones.

FIG. 5 is a schematic diagram of an example system for dividing a building into thermal zones based on a conceptual representation. The system generally consists of a CAD system 502. The CAD system 502 is optionally connected to one or more other computers 590 through a network 580. The CAD system 502 consists of one or more data processing apparatus. While only one data processing apparatus is shown in FIG. 5, multiple data processing apparatus can be used. The server 502 includes various modules, e.g. executable software programs, including a CAD tool 504 (e.g., a Building Information Model Application (BIMA)) to allow a user to generate and/or load a conceptual representation of a building design. CAD tool 504 includes a user interface 506 and a thermal zone generator 508.

Each module runs as part of the operating system on the CAD system 502, runs as an application on the CAD system 502, or runs as part of the operating system and part of an application on the CAD system 502, for instance. Although several software modules are illustrated, there may be fewer or more software modules. Moreover, the software modules can be distributed on one or more data processing apparatus connected by one or more networks or other suitable communication mediums.

The CAD system 502 also includes hardware or firmware devices including one or more processors 514, one or more additional devices 516, a computer readable medium 518, a communication interface 520, and one or more user interface devices 522. Each processor 514 is capable of processing instructions for execution within the server 502. In some implementations, the processor 514 is a single or multi-threaded processor. Each processor 514 is capable of processing instructions stored on the computer readable medium 518 or on a storage device such as one of the additional devices 516. The CAD system 502 uses its communication interface 520 to communicate with one or more computers 590, for example, over a network 580. Examples of user interface devices 522 include a display, a camera, a speaker, a microphone, a tactile feedback device, a keyboard, and a mouse. The CAD system 502 can store instructions that implement operations associated with the modules described above, for example, on the computer readable medium 518 or one or more additional devices 516, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a CAD model, analytical energy model, simulation results, analysis report) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying a perimeter zone for a first portion of a conceptual representation of a building; and
   dividing the perimeter zone into a plurality of thermal zones, comprising:
      determining a plurality of first candidate thermal zones based at least in part on a maximum thermal zone angle threshold that each of the first candidate thermal zones satisfy,
      determining a plurality of second candidate thermal zones based at least in part on a maximum thermal zone length threshold that each of the second candidate thermal zones satisfy, and
      selecting a plurality of thermal zones from the first candidate thermal zones and the second candidate thermal zones.

2. The method of claim 1, wherein the perimeter zone is defined as an area between an external curve loop and a corresponding interior curve loop, where the external curve loop represents an intersection between the first portion of the conceptual representation and a level plane.

3. The method of claim 2, wherein the corresponding internal loop is offset from the external loop by a specified perimeter distance.

4. The method of claim 2, wherein dividing the perimeter zone into the plurality of thermal zones comprises:
   dividing the perimeter zone into one or more initial thermal zones, each of the initial thermal zones being defined as an area between a respective portion of the external curve loop and a corresponding portion of the interior curve loop.

5. The method of claim 4, wherein determining the plurality of first candidate thermal zones based at least in part on the maximum thermal zone angle threshold comprises:
   for each of the one or more initial thermal zones, dividing the initial thermal zone into one or more first candidate thermal zones such that a respective angle of each of the first candidate zones does not exceed the maximum thermal zone threshold angle.

6. The method of claim 5, wherein each of the first candidate thermal zones has an equal angle.

7. The method of claim 4, wherein determining the plurality of second candidate thermal zones based at least in part on the maximum thermal zone length threshold comprises:
   for each of the one or more initial thermal zones, dividing the initial thermal zone into one or more second candidate thermal zones such that a respective length of each of the second candidate zones does not exceed a threshold length.

8. The method of claim 7, wherein each of the second candidate thermal zones is of equal length.

9. The method of claim 1, wherein selecting the plurality of thermal zones comprises:

comparing a total number of first candidate thermal zones to a total number of second candidate thermal zones.

10. The method of claim 1, further comprising:
   determining that a combined length of a first thermal zone and a second, adjacent thermal zone is below a first threshold value; and
   combining the first thermal zone and the second thermal zone.

11. The method of claim 10, further comprising:
   determining that a combined length of a third thermal zone and a fourth, adjacent thermal zone is greater than the first threshold value but below a second threshold value;
   determining that an angle along both the third thermal zone and the fourth thermal zone is below a third threshold value; and
   combining the third thermal zone and the fourth thermal zone.

12. The method of claim 1, wherein each of the plurality of thermal zones has a substantially even exposure to external factors affecting heating and cooling of the thermal zone.

13. The method of claim 1, further comprising:
   dividing the conceptual representation of the building into a plurality of thermal zone volumes, comprising:
   combining the thermal zones for the first portion of the building with thermal zones for one or more other, different portions of the building to generate the thermal zone volumes.

14. The method of claim 13, further comprising:
   providing the thermal zone volumes to an energy simulation process for simulating energy use in the building.

15. A non-transitory computer-readable storage device having stored thereon instructions, which, when executed by data processing apparatus, cause the data processing apparatus to perform operations comprising:
   identifying a perimeter zone for a first portion of a conceptual representation of a building; and
   dividing the perimeter zone into a plurality of thermal zones, comprising:
      determining a plurality of first candidate thermal zones based at least in part on a maximum thermal zone angle threshold that each of the first candidate thermal zones satisfy,
      determining a plurality of second candidate thermal zones based at least in part on a maximum thermal zone length threshold that each of the second candidate thermal zones satisfy, and
      selecting a plurality of thermal zones from the first candidate thermal zones and the second candidate thermal zones.

16. The computer-readable storage device of claim 15, wherein the perimeter zone is defined as an area between an external curve loop and a corresponding interior curve loop, where the external curve loop represents an intersection between the first portion of the conceptual representation and a level plane.

17. The computer-readable storage device of claim 16, wherein the corresponding internal loop is offset from the external loop by a specified perimeter distance.

18. The computer-readable storage device of claim 16, wherein dividing the perimeter zone into the plurality of thermal zones comprises:
   dividing the perimeter zone into one or more initial thermal zones, each of the initial thermal zones being defined as an area between a respective portion of the external curve loop and a corresponding portion of the interior curve loop.

19. The computer-readable storage device of claim 18, wherein determining the plurality of first candidate thermal zones based at least in part on the maximum thermal zone angle threshold comprises:
   for each of the one or more initial thermal zones, dividing the initial thermal zone into one or more first candidate thermal zones such that a respective angle of each of the first candidate zones does not exceed the maximum thermal zone threshold angle.

20. The computer-readable storage device of claim 19, wherein each of the first candidate thermal zones has an equal angle.

21. The computer-readable storage device of claim 18, wherein determining the plurality of second candidate thermal zones based at least in part on the maximum thermal zone length threshold comprises:
   for each of the one or more initial thermal zones, dividing the initial thermal zone into one or more second candidate thermal zones such that a respective length of each of the second candidate zones does not exceed a threshold length.

22. The computer-readable storage device of claim 21, wherein each of the second candidate thermal zones is of equal length.

23. The computer-readable storage device of claim 15, wherein selecting the plurality of thermal zones comprises:
   comparing a total number of first candidate thermal zones to a total number of second candidate thermal zones.

24. The computer-readable storage device of claim 15, the operations further comprising:
   determining that a combined length of a first thermal zone and a second, adjacent thermal zone is below a first threshold value; and
   combining the first thermal zone and the second thermal zone.

25. The computer-readable storage device of claim 24, the operations further comprising:
   determining that a combined length of a third thermal zone and a fourth, adjacent thermal zone is greater than the first threshold value but below a second threshold value;
   determining that an angle along both the third thermal zone and the fourth thermal zone is below a third threshold value; and
   combining the third thermal zone and the fourth thermal zone.

26. The computer-readable storage device of claim 15, wherein each of the plurality of thermal zones has a substantially even exposure to external factors affecting heating and cooling of the thermal zone.

27. The computer-readable storage device of claim 15, the operations further comprising:
   dividing the conceptual representation of the building into a plurality of thermal zone volumes, comprising:
   combining the thermal zones for the first portion of the building with thermal zones for one or more other, different portions of the building to generate the thermal zone volumes.

28. The computer-readable storage device of claim 27, the operations further comprising:
   providing the thermal zone volumes to an energy simulation process for simulating energy use in the building.

29. A system comprising:
   one or more data processing apparatus; and
   a non-transitory computer-readable storage device having stored thereon instructions that, when executed by the one or more data processing apparatus, cause the one or more data processing apparatus to perform operations comprising:

identifying a perimeter zone for a first portion of a conceptual representation of a building; and dividing the perimeter zone into a plurality of thermal zones, comprising:

determining a plurality of first candidate thermal zones based at least in part on a maximum thermal zone angle threshold that each of the first candidate thermal zones satisfy, determining a plurality of second candidate thermal zones based at least in part on a maximum thermal zone length threshold that each of the second candidate thermal zones satisfy, and selecting a plurality of thermal zones from the first candidate thermal zones and the second candidate thermal zones.

30. The system of claim 29, wherein the perimeter zone is defined as an area between an external curve loop and a corresponding interior curve loop, where the external curve loop represents an intersection between the first portion of the conceptual representation and a level plane.

31. The system of claim 30, wherein the corresponding internal loop is offset from the external loop by a specified perimeter distance.

32. The system of claim 30, wherein dividing the perimeter zone into the plurality of thermal zones comprises:

dividing the perimeter zone into one or more initial thermal zones, each of the initial thermal zones being defined as an area between a respective portion of the external curve loop and a corresponding portion of the interior curve loop.

33. The system of claim 32, wherein determining the plurality of first candidate thermal zones based at least in part on the maximum thermal zone angle threshold comprises:

for each of the one or more initial thermal zones, dividing the initial thermal zone into one or more first candidate thermal zones such that a respective angle of each of the first candidate zones does not exceed the maximum thermal zone threshold angle.

34. The system of claim 33, wherein each of the first candidate thermal zones has an equal angle.

35. The system of claim 32, wherein determining the plurality of second candidate thermal zones based at least in part on the maximum thermal zone length threshold comprises:

for each of the one or more initial thermal zones, dividing the initial thermal zone into one or more second candidate thermal zones such that a respective length of each of the second candidate zones does not exceed a threshold length.

36. The system of claim 35, wherein each of the second candidate thermal zones is of equal length.

37. The system of claim 29, wherein selecting the plurality of thermal zones comprises:

comparing a total number of first candidate thermal zones to a total number of second candidate thermal zones.

38. The system of claim 29, the operations further comprising:

determining that a combined length of a first thermal zone and a second, adjacent thermal zone is below a first threshold value; and combining the first thermal zone and the second thermal zone.

39. The system of claim 38, the operations further comprising:

determining that a combined length of a third thermal zone and a fourth, adjacent thermal zone is greater than the first threshold value but below a second threshold value;

determining that an angle along both the third thermal zone and the fourth thermal zone is below a third threshold value; and combining the third thermal zone and the fourth thermal zone.

40. The system of claim 29, wherein each of the plurality of thermal zones has a substantially even exposure to external factors affecting heating and cooling of the thermal zone.

41. The system of claim 29, the operations further comprising:

dividing the conceptual representation of the building into a plurality of thermal zone volumes, comprising:

combining the thermal zones for the first portion of the building with thermal zones for one or more other, different portions of the building to generate the thermal zone volumes.

42. The system of claim 41, the operations further comprising:

providing the thermal zone volumes to an energy simulation process for simulating energy use in the building.

* * * * *